United States Patent [19]

Ishikawa et al.

[11] Patent Number: 4,908,255

[45] Date of Patent: Mar. 13, 1990

[54] SEPARATE PLATE AND PROCESS FOR PRODUCING THE SAME

[75] Inventors: Kazunori Ishikawa; Takuji Taniguchi; Kazumasa Tsukamoto, all of Anjo; Shiro Goto, Shinshiro, all of Japan

[73] Assignee: Aisin AW Co., Ltd., Aichi, Japan

[21] Appl. No.: 243,002

[22] Filed: Sep. 12, 1988

[30] Foreign Application Priority Data

Sep. 14, 1987 [JP] Japan ............................ 62-231455

[51] Int. Cl.$^4$ ............................................ B32B 3/10
[52] U.S. Cl. .................................... 428/131; 428/137; 428/198; 428/200; 428/209; 428/542.8; 277/224
[58] Field of Search ............... 428/131, 137, 542.8, 428/198, 200, 209; 180/70.1; 277/224

[56] References Cited

U.S. PATENT DOCUMENTS

| | | | |
|---|---|---|---|
| 1,174,359 | 3/1916 | Shaffer et al. | 277/224 |
| 2,368,380 | 9/1942 | Ruzicka | 277/224 |
| 4,299,401 | 11/1981 | McCormick | 277/224 |

Primary Examiner—Ellis P. Robinson
Assistant Examiner—P. J. Ryan
Attorney, Agent, or Firm—Varndell Legal Group

[57] ABSTRACT

A separate plate for use in a valve body of an automatic transmission has a gasket bonded to each side of the separate plate. The gasket is provided with boxes which are different in configuration from bores provided in the separate plate. Bores are punched out in the separate plate and the gasket coated with an adhesive, separately from each other, and then the separate plate and the gasket are bonded together in one unit. Accordingly, it is possible to provide a separate plate having improved assembling efficiency and superior resistances to heat, oil and rupture.

5 Claims, 8 Drawing Sheets

FIG. 3

| Testing items | | | Present invention | Prior art |
|---|---|---|---|---|
| Hot-oil shrinkage factor (%) | | Length | -0.010 | -0.281 |
| | | Breadth | +0.018 | -1.138 |
| Humidity shrinkage factor (%) | | Length | +0.009 | +0.107 |
| | | Breadth | -0.045 | +1.132 |
| Stress relaxation (%) | Surface pressure kgf/cm² | 100 | 46.0 | 58.3 |
| | | 210 | 30.3 | 40.1 |
| | | 328 | 23.6 | 30.0 |
| Practical test Hotoil 150°C continuous for 168hr | Torque down factor (%) | | 41.7 | 67.5 |
| | Appearance | Break | None | None |
| | | Releasability | Extremely easy | Extremely easy |
| | | others | No abnormality | No abnormality |
| Thermal shock test -40°C 180°C 25cyles | Torque down factor (%) | | 70.8 | 88.0 |
| | Appearance | Break | None | Many |
| | | Releasability | Extremely easy | Extremely easy |
| | | others | No abnormality | No abnormality |
| Rupture test 150°C 1cycle 24hr | | | No abnormality throughout 18cycles | Ruptured in 1cycle |

SEPARATE PLATE AND PROCESS FOR PRODUCING THE SAME

BACKGROUND OF THE INVENTION

The present invention relates to a separate plate for use in a valve body of an automatic transmission. The presetn invention also pertains to a process for producing a separate plate of the type described above.

FIG. 4 shows a general structure of a valve body of a typical automatic transmission. More specifically, the valve body comprises a lower valve body member 1 and upper valve body members 2 and 3. Inside the valve body defined by these valve body members are formed grooves for accommodating various kinds of valve, for example, a manual valve 4 and an oil cooler bypass valve 5, and grooves for accommodating accumulators, together with oil passages. A separate plate is sandwiched between the lower valve body member 1 and the upper valve body members 2, 3 and is fastened thereto by means of bolts. The separate plate has a first gasket sheet 6, a plate 7 for hydraulic control and a second gasket sheet 8.

FIG. 5 is a plan view of the lower valve body member 1, while FIG. 6 is a plan view of the upper valve body members 2 and 3.

Referring to FIG. 7, which is a plan view of the plate 7, the plate 7 is provided with a multiplicity of bores which provide communication between the lower valve body member 1 and the upper valve body members 2, 3 to control the oil-hydraulic circuit. The respective diameters of these bores are designed so that predetermined levels of pressure are maintained in the oilhydraulic circuit.

FIG. 8 is a plan view of one of the gaskets 6 and 8. The gasket is, as a matter of course, provided with bores in correspondence to the multiplicity of bores in the plate 7, but the diameters and configurations of these bores are not necessarily the same as those of the bores in the plate 7. As will be understood by seeing through FIGS. 7 and 8 laid one upon the other, the bores b, for example, in the gasket which correspond to the orifices a in the plate 7 have larger diameters than those of the latter. This is because the diameters of the orifices are required to have a relatively high degree of accuracy and it is therefore necessary to prevent the orifices from being partially closed by the gasket due to misalignment between the plate 7 and the gasket. Further, some orifices are chamfered for the purpose of stabilizing the flow velocity of oil and it is therefore necessary in order to avoid an interference with this function to set the diameters of the bores in the gasket so as to be larger than the diameters of the corresponding orifices in the plate 7. In addition, it is necessary to provide the gasket with openings c which allow the springs of accumulators or the balls of ball check valves to be in contact with the plate 7.

However, the above-described prior art (hereinafter referred to as "the prior art ①"), in which the plate 7 is clamped at both sides thereof between the gaskets 6 and 8 and rigidly secured by menas of bolts, has the problem that it is necessary to confirm the obverse and reverse sides of the gaskets and align these members when rigidly secured by means of bolts. The prior art ① also suffers from inferior assembling efficiency, that is, there is a fear of the gaskets being folded during assembly.

Further, the prior art ① has the problem that the gasket may be cracked as shown in FIG. 9 due to the difference in thermal expansion coefficient between the gasket and the valve body in actual use where high-temperature and high-pressure oil acts thereon. When the bolt fastening is relatively strong, cracks are generated in the end face portions of the gasket where it is in contact with the casing or the valve body, whereas, when the bolt fastening is relatively weak, cracks start from bores in the gasket, such as bolt receiving bores and oil bores. If cracks are generated in the gasket, the sealing properties deteriorate, so that oil may leak out to lower the level of oil pressure, thus causing a mal-operation of the oil-hydraulic controller. There is also a fear of fragments of the gasket entering the oil-hydraulic circuit to cause sticking of valves, which leads to a failure.

To solve the above-described problems, a method wherein a rubber material or the like is applied to each side of a plate by means of coating or bonding and then this plate and two gaskets are bonded together in one unit is proposed, for example, in Japanese Patent Public Disclosure No. 61-109960 (1986). This prior art (hereinafter referred to as "the prior art ②") suffers, however, from a low degree of punching accuracy since bores, such as orifices, are formed in the plate by means of punching after both sides of the plate have been coated with a rubber material or the like. In the prior art ② also, each gasket must be provided with bores b in correspondence to the orifices in the plate, the bores b having larger diameters than those of the corresponding orifices, and some of the orifices need to be chamfered. Further, the gasket must be provided with openings which allow the springs of accumulators or the balls of ball check valves to be in contact with the plate 7. These steps involve complicated and troublesome operations, as described above.

SUMMARY OF THE INVENTION

In view of the above-described problems of the prior arts, it is a primary object of the present invention to provide a separate plate which has improved assembling efficiency and superior resistances to heat, oil and rupture, and also provide a process for producing such a separate plate.

To this end, the present invention provides a separate plate for use between upper and lower valve body members in the valve body of an automatic transmission. In the present invention, gasket sheets are adhesively bonded to each side of a plate. Prior to bonding, the gasket sheets and the plate are provided wth bores. The bores in the gasket sheets are different in size from the bores in the plate. The separate palte according to the present invention can be produced by a process which comprises: separately punching out bores (or holes) in the plate and the gasket sheets coated with an adhesive, and then bonding the plate and the gasket sheets together in one unit.

Since in the present invention the plate and the gaskets are bonded together in one unit, the resistances to heat, oil and rupture are improved and the sealing properties are bettered, so that there is no fear that the oil-hydraulic controller may cause a mal-operation or valves may stick.

In addition, it is unnecessary to confirm the obverse and reverse sides of the gaskets and conduct alignment, and there is no possibility that the gaskets may be undesirably folded. Thus, the assembling efficiency is improved.

Since the plate and the gaskets are punched separately from each other, it is unnecessary, in contrast to the prior art ②, to carry out the step of making the diameters of the bores in the gaskets larger than the diameters of the corresponding orifices in the separate plate and the step of providing the gaskets with openings which allow the springs of accumulators or the balls of ball check valves to be in contact with the plate, and it is possible to improve the punching accuracy.

BRIEF DESCRIPTION OF THE DRAWINGS

FIG. 3 shows advantages of the present invention;

DESCRIPTION OF THE PREFERRED EMBODIMENTS

Embodiments of the present invention will be described hereinunder with reference to the accompanying drawings.

Figure 1:
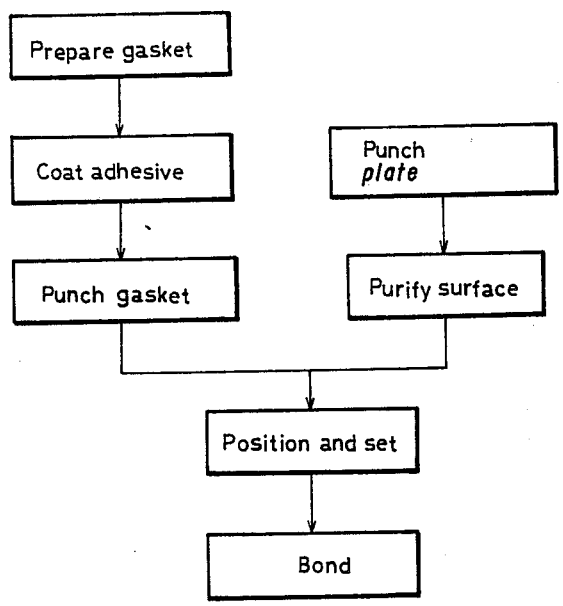
FIG. 1 shows one embodiment of the process for producing a separate plate according to the present invention.
Figure 2:
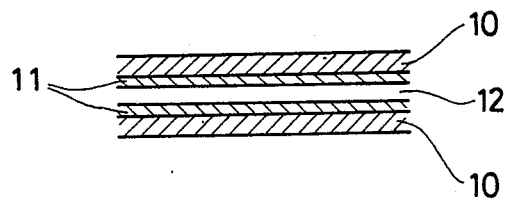
FIG. 2 is a sectional view showing one embodiment of the separate plate according to the present invention.
Figure 4:
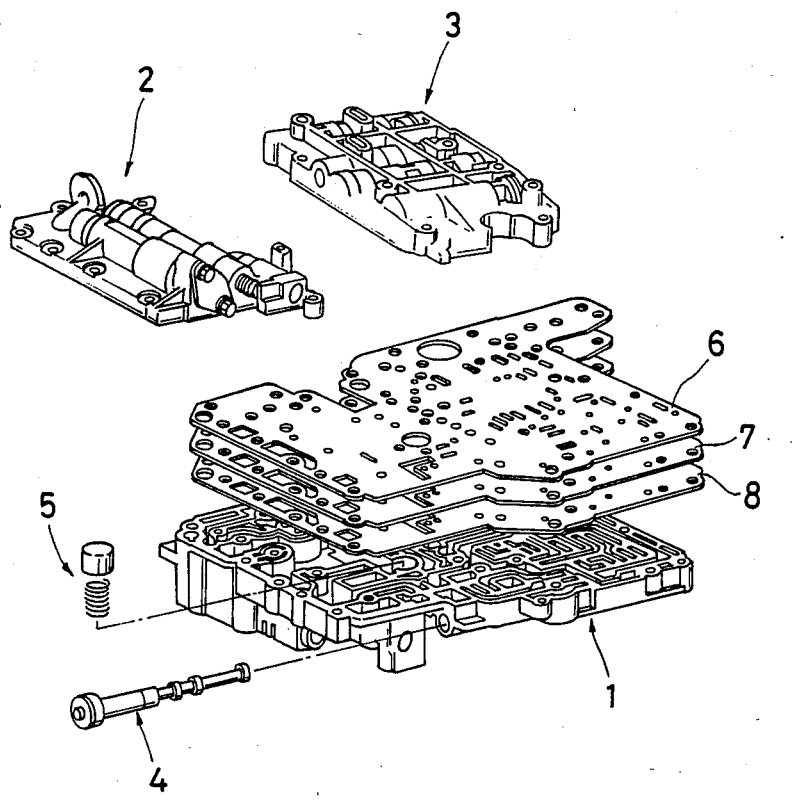
FIG. 4 is an exploded perspective view of a valve body, which shows a conventional separate plate.
Figure 5:
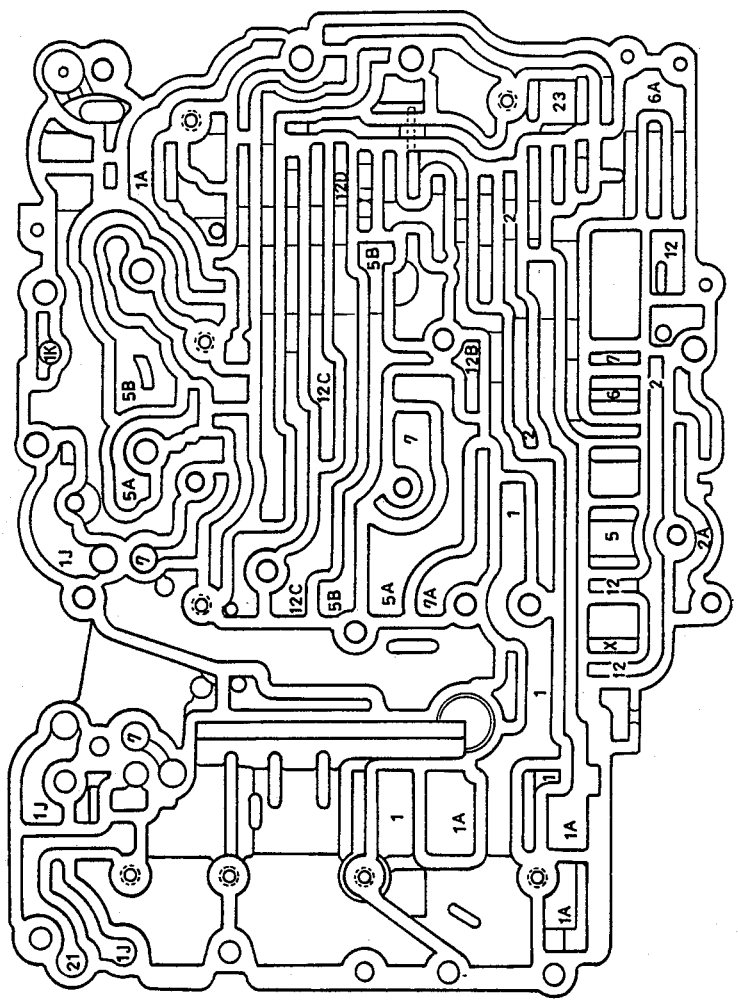
FIG. 5 is a plan view of the lower valve body member shown in FIG. 4.
Figure 6:
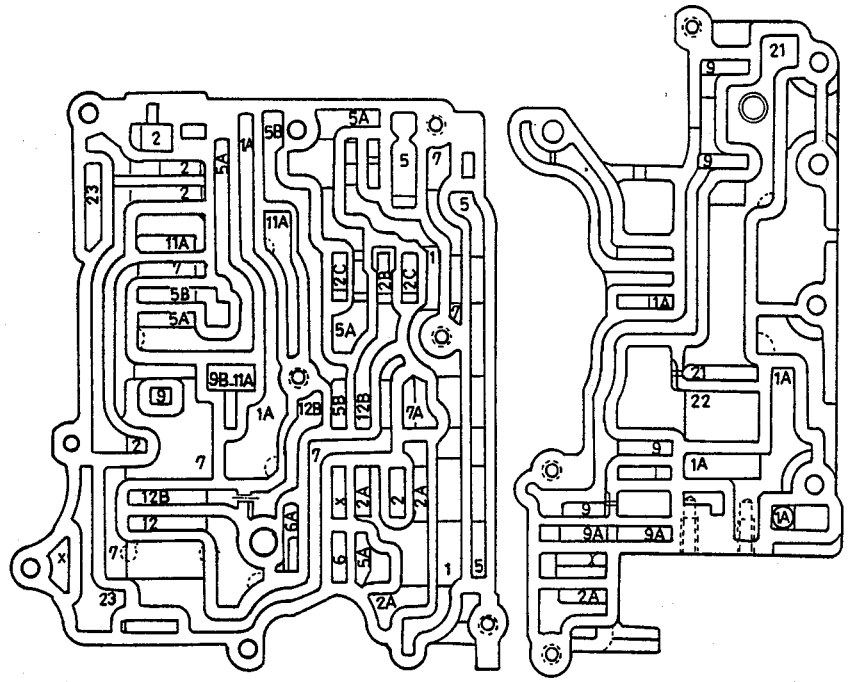
FIG. 6 is a plan view of the upper valve body members shown in FIG. 4.

FIG. 1 shows one embodiment of the process for producing a separate plate according to the present invention; FIG. 2 is a sectional view showing one embodiment of the separate plate according to the present ivnention; and FIG. 3 shows advantages of the present invention.

Figure 7:
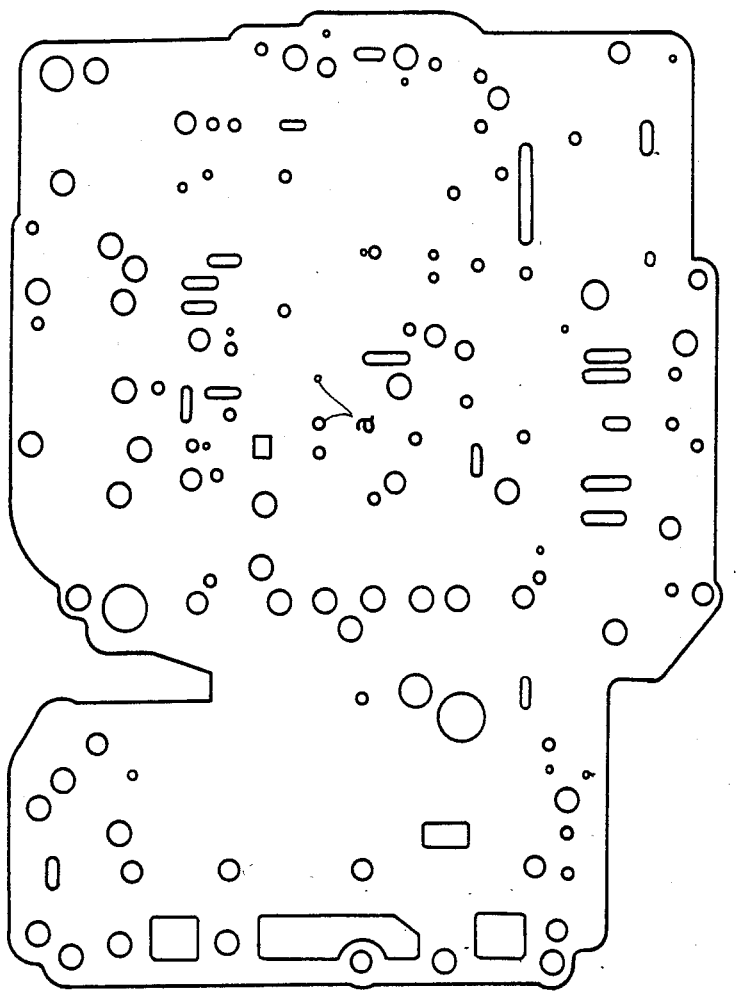
FIG. 7 is a plan view of the plate shown in FIG. 4.
Figure 8:
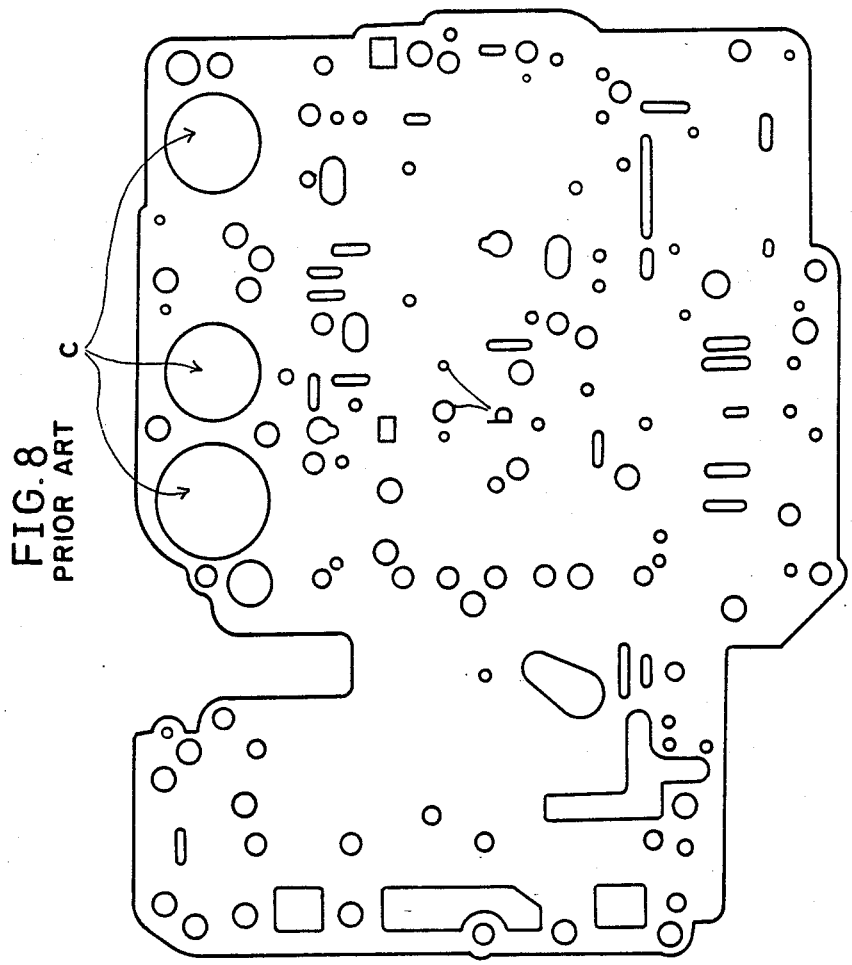
FIG. 8 is a plan view of one of the gaskets shown in FIG. 4; -
Figure 9:
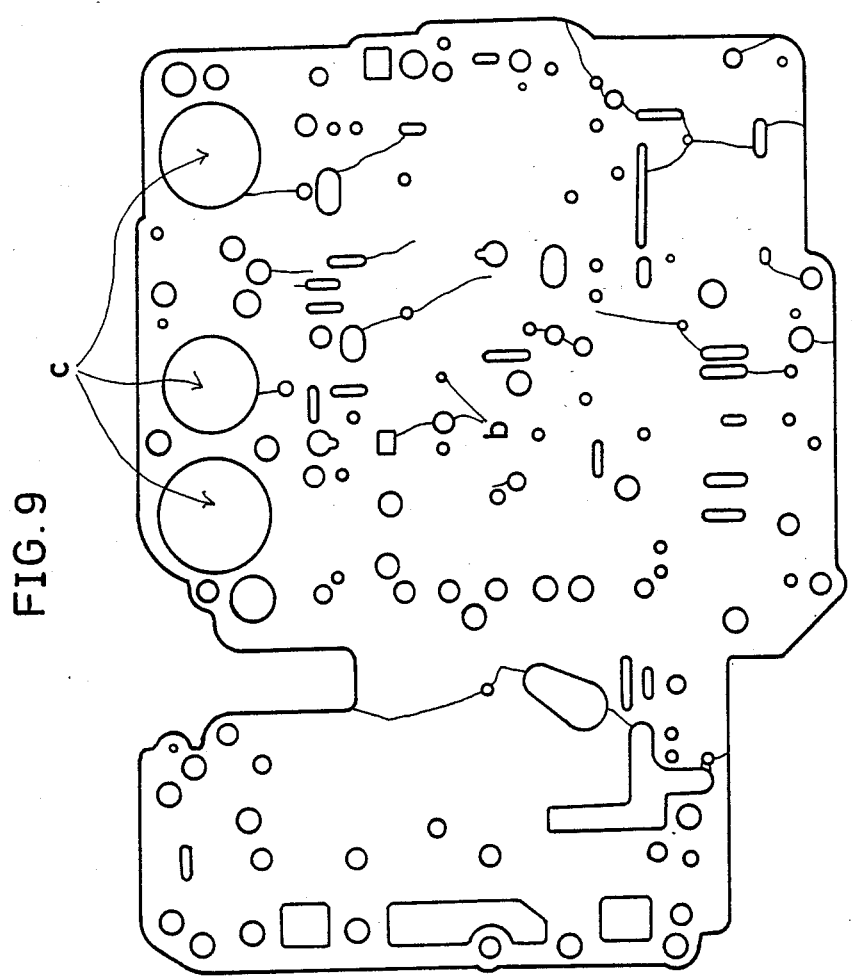
FIG. 9 is a plan view of the gasket, which shows the problems of the prior art.

The process for producing a separate plate according to the present invention will first be explained with reference to FIG. 1. First of all, a phenolic resin material or a rubber material is added to pulp as a main raw material to prepare a solution, and a gasket sheet is produced from this solution using a paper machine. After one side of this gasket sheet has been coated with an adhesive, a multiplicity of bores are punched out in the gasket sheet, as shown in FIG. 8. On the other hand, a multiplicity of bores are punched out in the plate, as shown in FIG. 7, and the surfaces of the plate are purified. Thereafter, the gasket sheet is laid on each side of the plate, and these members are set while being positioned with respect to each other and then bonded together on heating using a hot press.

FIG. 2 is a sectional view of the separate plate thus obtained.

The gaskets sheet 10 may be produced from a material which comprises one fiber material selected from among organic and inorganic fiber materials, or a combination of some of these fiber materials, a binder, a filler, chemicals, etc. It is also possible to employ expanded graphite sheet as a material for the gaskets 10. Examples of binders which are usable in the present ivnention include elastomers such as NBR, ACM and FPM and plastomerms such as thermosetting resins and fluorocarbon resins. The thickness of each gasket 10 is set at 0.5 mm or less with a view to maintaining the required stress relaxation factor.

It is preferable to form the plate 12 from a metallic material; however, a nonmetallic material may be employed, provided that it satisfies the required function and it is capable of being bonded. As to the adhesive 12, it is preferable to employ a thermosetting or composite type adhesive, although types of adhesive which are usable in the present invention are limited according to the use conditions (fastening condition, fluid temperature, pressure, time, etc.).

The results of tests carried out on the separate plate of the present invention and the separate plate according to the prior art ① will next be explained with reference to FIG. 3.

As will be clear from FIG. 3, the present invention is improved in comparison with the prior art ① in terms of the hot-oil shrinkage factor, the humidity shrinkage factor and the stress relaxation factor. The torque down factors in the practical test and the thermal shock test are reduced to 41.7% and 70.8%, respectively. In the rupture test also, a favorable result was obtained in comparison with the prior art ①. It should be noted that the torque down factor was determined by measuring the initial tightening torque $T_1$ and the torque $T_2$ at the time when each bolt started to move when tighteneed again after the test and then calculating $(T_1-T_2)/T_1\times 100$.

What we claim is:

1. A separate plate for use between upper and lower valve body members of a valve body of an automatic transmission, said separate plate comprising a plate having bores therein and a pair of gasket sheets adhesively bonded to each side thereof, said gasket sheet having bores corresponding to and being larger than said bores in said plate for providing oil communication between oil passages in said upper and lower valve body members.

2. A separate plate according to claim 4, wherein the thickness of said gasket is 0.5 mm or less.

3. A separate plate according to claim 1, wherein said plate is made of at least one metal.

4. A separate plate according to claim 1, wherein said gasket sheets are made of a material selected from the group consisting of organic fibers, inorganic fibers and mixtures thereof.

5. A separate plate according to claim 1, wherein said adhesive gasket sheets are bonded to said plate by a thermosetting adhesive.

* * * * *